United States Patent

Renkl et al.

[11] Patent Number: 5,863,127
[45] Date of Patent: Jan. 26, 1999

[54] APPARATUS FOR REMOVING CHEMICALLY REACTIVE SYNTHETIC RESIN COMPONENTS FROM THE OUTLET CHAMBER OF A MIXING HEAD

[75] Inventors: Josef Renkl, Markt Indersdorf; Ludwig Stippl, Wiedenzhausen, both of Germany

[73] Assignee: Krauff-Maffei AG, Munich, Germany

[21] Appl. No.: 724,022

[22] Filed: Sep. 20, 1996

[30] Foreign Application Priority Data

Sep. 23, 1995 [DE] Germany ............... 195 35 474.5

[51] Int. Cl.⁶ .................................................. B01F 15/00
[52] U.S. Cl. ............................................ 366/138; 366/349
[58] Field of Search ...................... 366/138, 162.5, 366/101, 193, 349; 425/225, 231; 134/1, 6, 199, 198, 111; 239/123

[56] References Cited

U.S. PATENT DOCUMENTS

| | | | |
|---|---|---|---|
| 3,799,403 | 3/1974 | Probst et al. | 366/162.5 |
| 4,239,732 | 12/1980 | Schneider | 366/162.5 |
| 4,515,091 | 5/1985 | Schlueter | 425/225 |
| 4,600,312 | 7/1986 | Scrivo | 366/162.5 |
| 4,899,912 | 2/1990 | Pontius et al. | 366/162.5 |
| 5,082,633 | 1/1992 | Stuper | 366/162.5 |

FOREIGN PATENT DOCUMENTS

| | | |
|---|---|---|
| 32 31 795 | 3/1984 | Germany. |
| 86 16 880 | 1/1987 | Germany. |
| 43 40 559 | 6/1995 | Germany. |
| 44 11 901 | 10/1995 | Germany. |

*Primary Examiner*—Tony G. Soohoo
*Attorney, Agent, or Firm*—Herbert Dubno

[57] ABSTRACT

A mixing head has traces of the reactive mixture of synthetic resin components removed therefrom by insertion into a housing or rinsing flange into which a rinsing liquid, e.g. hot water, is forced via nozzles or orifices trained inwardly of the plane of the mixing head. The mixture of rinsing liquid and removed residue is passed through a bag filter in which the residue is collected and the rinsing liquid is recirculated.

20 Claims, 4 Drawing Sheets

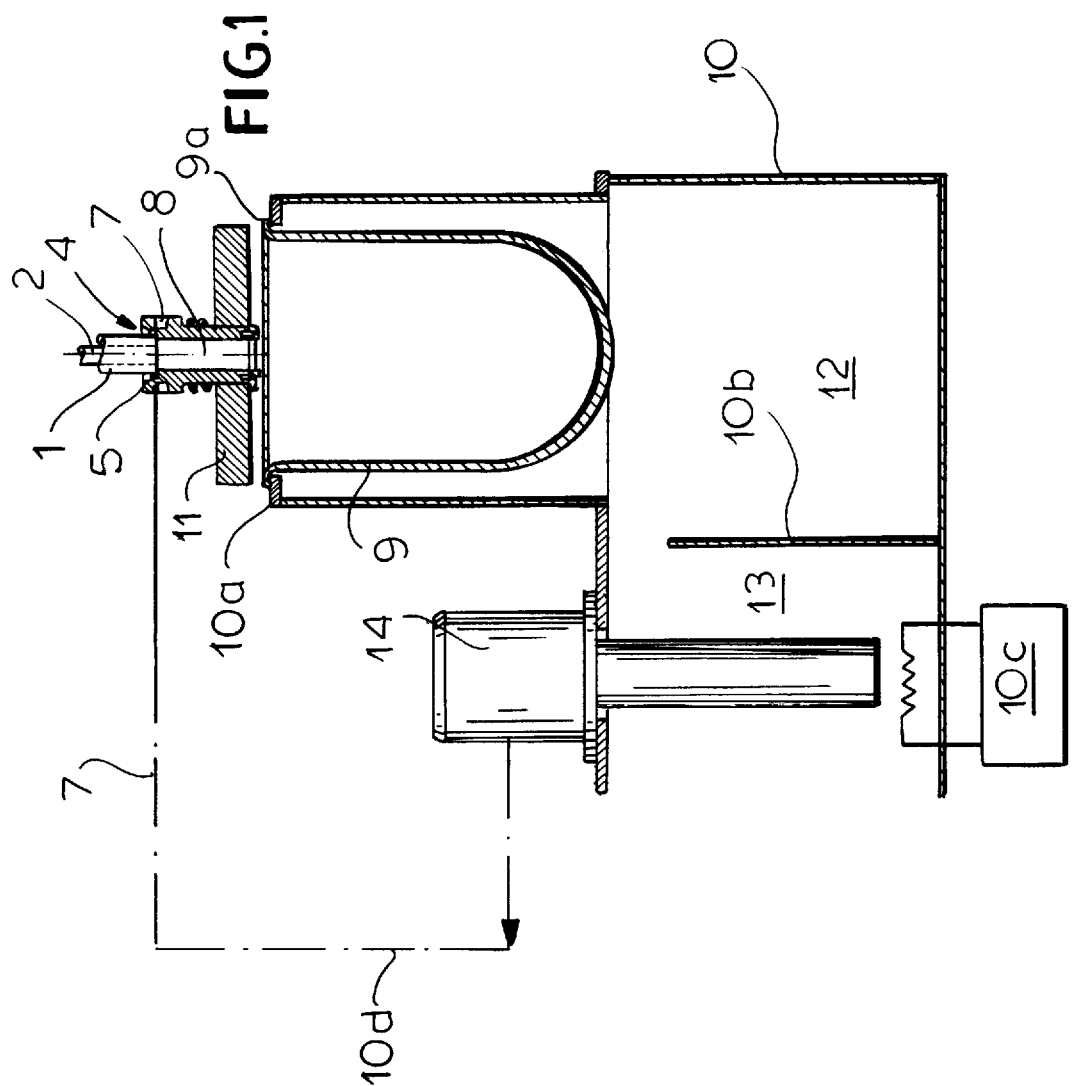

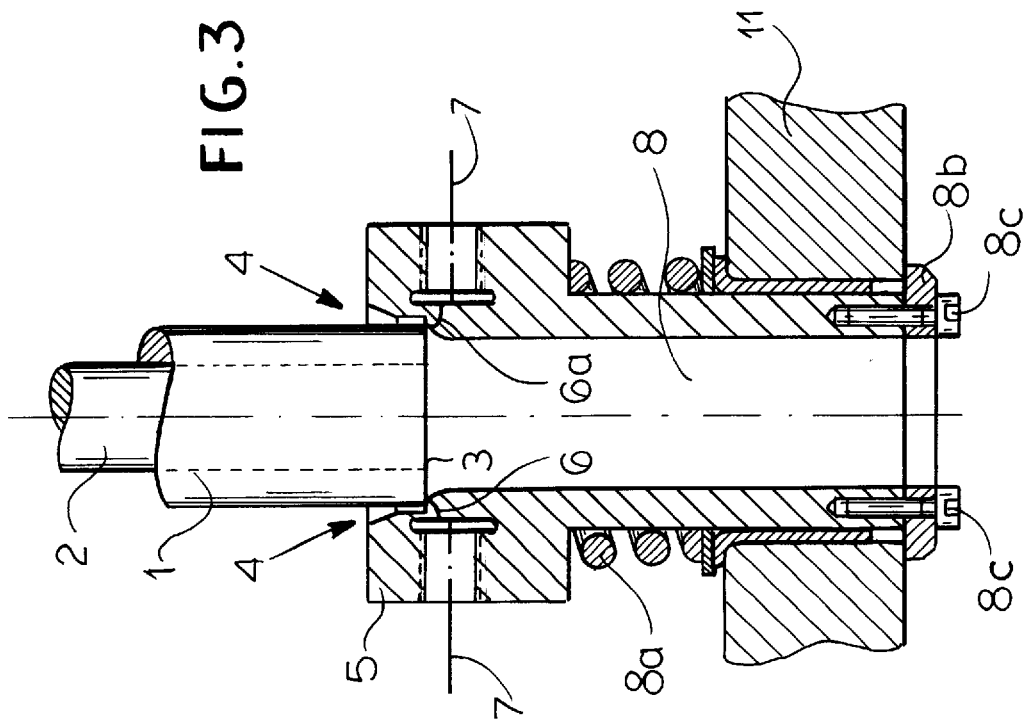
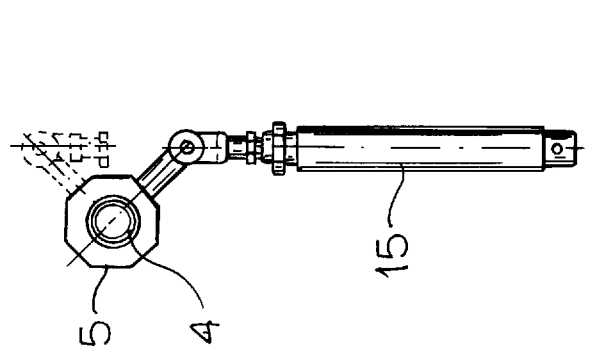

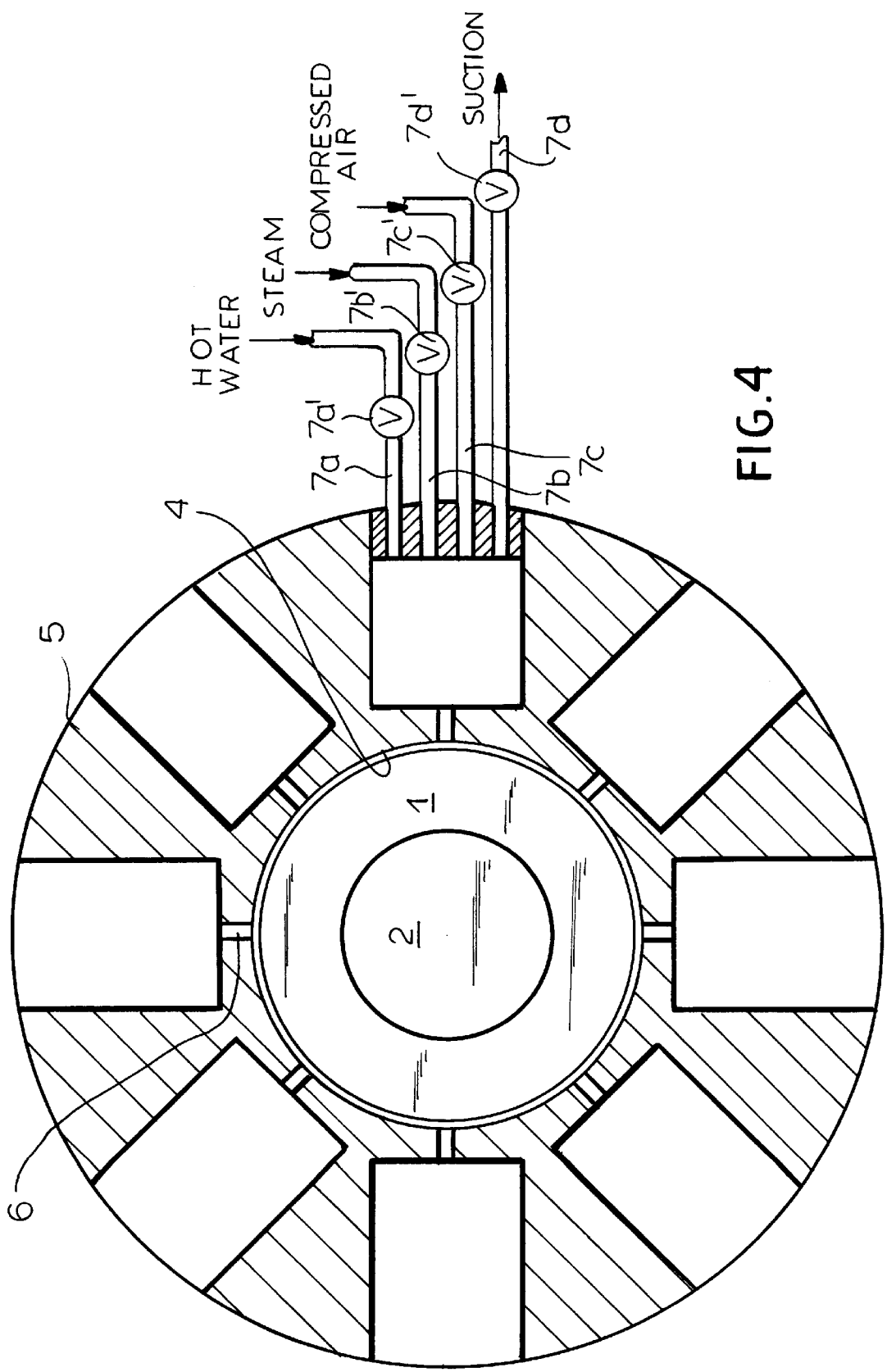

APPARATUS FOR REMOVING CHEMICALLY REACTIVE SYNTHETIC RESIN COMPONENTS FROM THE OUTLET CHAMBER OF A MIXING HEAD

FIELD OF THE INVENTION

Our present invention relates to an apparatus for the removal of chemically reactive synthetic resin mixtures formed from chemically reactive components in injection cycles of a mixing head which can have a discharge chamber in which a cleaning plunger is reversibly displaceable back and forth and, in particular, for cleaning from the mouth or outlet opening of this discharge chamber at each cycle the droplets or residues of the synthetic resin mixture. The invention also relates to a method of cleaning such residues from the outlet or mouth of such a discharge chamber.

BACKGROUND OF THE INVENTION

In the production of synthetic resin articles from reactive mixtures, for example, polyurethane articles in which one reactive component may be a di-isocyanate or polyisocyanate and another reactive component can be a di-ol or polyol, use can be made of a so-called mixing head into which the components are pumped and in which the components mix in a mixing chamber which has an outlet or mouth which opens directly into a mold or other cavity in which the shape is imparted to the mixture, or which opens into a further chamber, the latter in turn having a mouth or outlet opening into the mold. The chambers can be swept clean of the mixture by a plunger which can be displaced toward the plane of the mouth and can have an end which lies more or less flush with the mouth in its final position.

The mixing chamber is generally cylindrical and the components of the synthetic resin are generally injected in counterflow into the mixing chamber, i.e. from diametrically opposite orifices. The cleaning plunger which is reversibly displaceable in the mixing chamber, i.e. displaceable back and forth or the control or cleaning plunger which is displaceable in the calming chamber which is downstream of the mixing chamber and usually at an angle thereto, suffices to remove most of the reactive component from the respective chamber but, when the end of the plunger reaches the end of the chamber and lies flush with the mouth, there is the possibility that some droplets of the mixture can form a residue at the mouth of the chamber.

This residue must be removed after each cycle since it rapidly would solidify and be detrimental to the quality of the products made in subsequent cycles or even prevent the reaction mixture from passing effectively into the mold.

It is known, for example, to clean the outlet opening or mouth of a mixing head of the aforedescribed type with wires, blades, rotating brushes, stationary brushes or to use compressed air to remove the residue. The devices provided for this purpose have the drawback that they are largely ineffective or are only incompletely effective and cannot prevent some quantity of the residue from foaming and solidifying and then adhering strongly to the surfaces of the head. Large amounts of foamed residue tend to be produced with earlier systems and the use of earlier apparatus has been found to be labor intensive.

OBJECTS OF THE INVENTION

It is, therefore, the principal object of the present invention to provide a device for cleaning the outlet opening or mouth of the mixing head for a two component system whereby the drawbacks of earlier systems are avoided.

More specifically, it is an object of the invention to provide a cleaning device which will result in a reduced volume of residue, minimize maintenance and labor cost and will yield improved cleaning results.

It is also an object of the invention to provide an improved method of cleaning mixing heads of the type described from foamable residues of the reactive mixture at the mouth of the head.

SUMMARY OF THE INVENTION

These objects are attained, in accordance with the invention with a device having a rinsing flange, i.e. a housing formed with a flange in which an opening is provided which can accommodate at least the end of the mixing or calming chamber of the mixing head which is positioned in this annular opening of the housing after each injection cycle and which is provided with one or more spray nozzles or orifices directed substantially radially inwardly in the plane of the mouth of the head and one or more conduits or lines for feeding the orifice or orifices with a rinsing medium, i.e. a liquid, under pressure.

More particularly, a device for removing droplet residues of a plastic composition formed from two chemically reactive components of a synthetic resin on a mouth of a discharge chamber of a mixing head in which a cleaning plunger is reversibly displaceable can comprise:

a housing formed with an annular opening receiving the mouth of the head;

at least one inwardly directed generally radial spray nozzle formed in the housing, trained upon the mouth of the head, and lying in a plane of the mouth; and at least one conduit connected to each the spray nozzle for supplying a rinsing medium under pressure thereto, whereby the rinsing medium removes the residue from the head.

The invention is based upon the fact that any residue of the reaction mixture remaining on the mouth of the mixing head, which normally would be foamed by contact with the liquid rinsing medium, can be accelerated as to reaction time by the rinsing medium so that there is little or no foaming and a destruction of any cellular structure which may tend to form and thus the residue is removed in its dense form as it is carried away by the rinsing medium and can be collected in a far less voluminous amount than is the case with the residues collected by prior techniques.

Preferably the medium contains water and the residue/water mixture is passed through a filter which can be provided with a filter bag from which the partly foamed residue is filtered from the water and is collected as a reduced volume residue. By replacement of the filter bag, the residue is easily removed from the apparatus while the rinsing medium can be reused without problems.

According to another feature of the invention, a drive can be connected with the housing, i.e. the rinsing flange, for rotating same relative to the mixing head. An outlet tube can be formed in the housing and can communicate with the annular opening for conducting the rinsing medium and residues away from the head. A collecting vessel can be provided downstream of the filter for collecting the rinsing medium from which the residues have been separated and the collecting vessel itself can be formed with a settling chamber and with a pumping chamber separate from the settling chamber by an overflow weir.

The rinsing medium is water, preferably hot water which can be mixed with or replaced by steam and, according to the invention, the mouth of the mixing head may be subjected to compressed air or to suction while it is positioned in the annular opening.

An industrial robot can be provided for positioning the head in the annular opening after each injection cycle.

The housing can have at least one orifice in the aforementioned plane entrained on the mouth of the mixing head for supplying a pressurized drying gas thereto.

The method of removing droplet residues can comprise the steps of:

(a) introducing the head into an annular opening formed in a housing;

(b) directing against the mouth of the head in the opening a rinsing jet of a rinsing medium from a plurality of inwardly directed generally radial spray nozzles formed in the housing and lying in a plane of the mouth;

(c) collecting rinsing medium and removed residues in a settling chamber, the rinsing medium passing over an overflow weir into a pumping chamber;

(d) recirculating the rinsing medium to the nozzles from the pumping chamber; and (e) drying the mouth of the head by directing pressurized drying gas through at least some of the nozzles at the mouth.

BRIEF DESCRIPTION OF THE DRAWING

The above and other objects, features, and advantages will become more readily apparent from the following description, reference being made to the accompanying drawing in which:

FIG. 1 is a highly diagrammatic cross sectional view of a device according to the invention showing the end of a mixing head and the rinsing flange or housing with its filter, collecting vessel, pump and recirculation line;

FIG. 2 is a view, also in diagrammatic form, showing a drive for the rinsing flange and how the housing rotates during the course of the rinsing operation;

FIG. 3 is an axial section drawn to a larger scale of the housing or rinsing flange;

FIG. 4 is a transverse section through the housing illustrating the radially directed orifices and the conduit systems which can be connected thereto;

SPECIFIC DESCRIPTION

Figure 6:
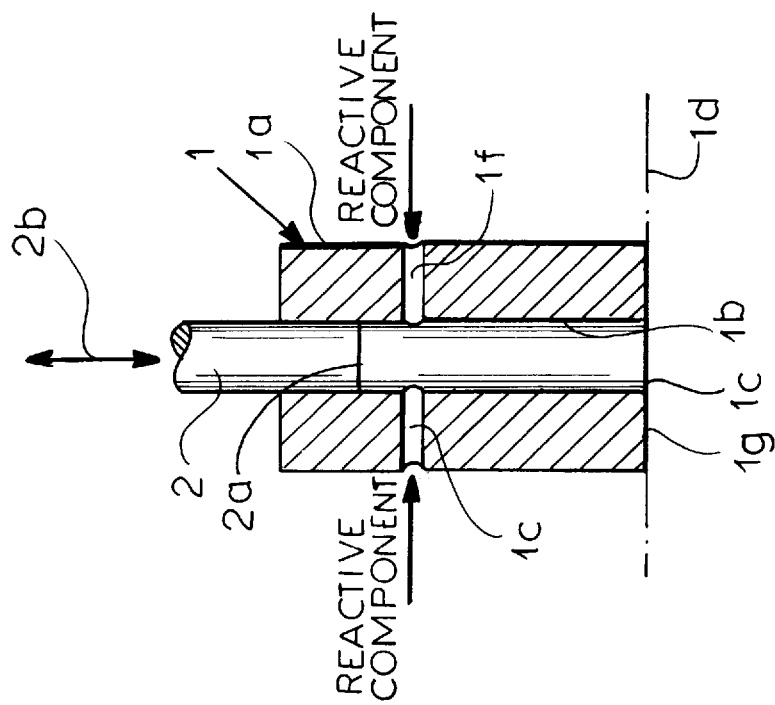
FIG. 6 is an illustration in cross section of a mixing head to which the device and method of the invention are applicable.

A typical mixing head 1, shown diagrammatically in FIG. 6, can comprise a cylindrical body 1a forming an outlet chamber 1b having a mouth 1c lying in a plane 1d which coincides with the plane 2a of the end of a cleaning plunger 2 which is displaceable back and forth in the mixing head as represented by the arrow 2b. When the plunger 2 is retracted past the radial orifices 1e and 1f through which the two reactive components are pumped in opposition to one another, mixing of the two components can occur ahead of the end of the plunger, the advance of which can drive that mixture through the mouth 1c into a mold. Even though the plunger 2 drives substantially all of the reacting mixture, which can foam in the mold, out of the chamber 1b, some residue of the reacting mixture tends to remain on the end surface 1g and on the end face 2a of the plunger at the mouth 1c and it is this residue which is removed with the device shown in FIGS. 1–3. Here the mixing head is represented generally at 1.

At the end of the filling cycle, with the end 2a of the plunger 2 flush with the surface 1g at the mouth 1c of the mixing chamber or, where a quiescent chamber is used downstream of the mixing chamber, with the plunger of the quiescent chamber flush with the mouth, the end of the mixing head 1 is inserted so that its outlet opening 3 is received in an annular opening 4 of a rinsing flange or housing 5 so that the plane of the outlet opening 3 coincides with the plane of spray nozzles or orifices 6 into which one or more feedlines 7 can open.

More particularly, as is also apparent from FIGS. 1–3, the annular opening 4 can communicate with an outlet tube 8 which can open into a filter bag 9 which is positioned above a collecting vessel 10. The tube 8 can, as can be seen from FIG. 3, be surrounded by a coil spring 8a which biases a collar or plate 11 downwardly against a stop 8b held at the end of the tube 8 by screws 8c, the plate 11 being slidable upwardly toward the annular flange 5 against the force of the spring 8.

When the flange or housing 5 is pressed downwardly against an annular rim 10a of the housing 10 over which the end 9a of the filter 9 is positioned, the collar 11 can seal against the filter which can thus receive the rinsing medium and residue mixture, the sealing being maintained by the compression spring 8a.

The vessel 10, in turn, is formed with a settling chamber 12 which is separated by a pump chamber 13 by an overflow weir 10b over which the rinsing medium, usually water, can pass. A heating means can be provided as represented at 10c to heat the water when hot water is to serve as the rinsing medium. A recirculating line 10d connects the pump 14 with the conduit 7 feeding the orifice or orifices 6.

As can be seen from FIG. 2, which shows the rinsing flange or housing 5 from above, a hydraulic cylinder 15 can be linked to this flange so as to rotate the flange 5 about the vertical axis and relative to the mixing head during the rinsing operation. The back and forth rotation of the housing or flange 5 serves to sweep the orifices around the head and thereby assure thorough flushing of the mixing head. The starting position in the angular displacement in the housing or flange 5 has been shown in solid lines in FIG. 2 and the opposite extreme position in broken lines.

Figure 5:
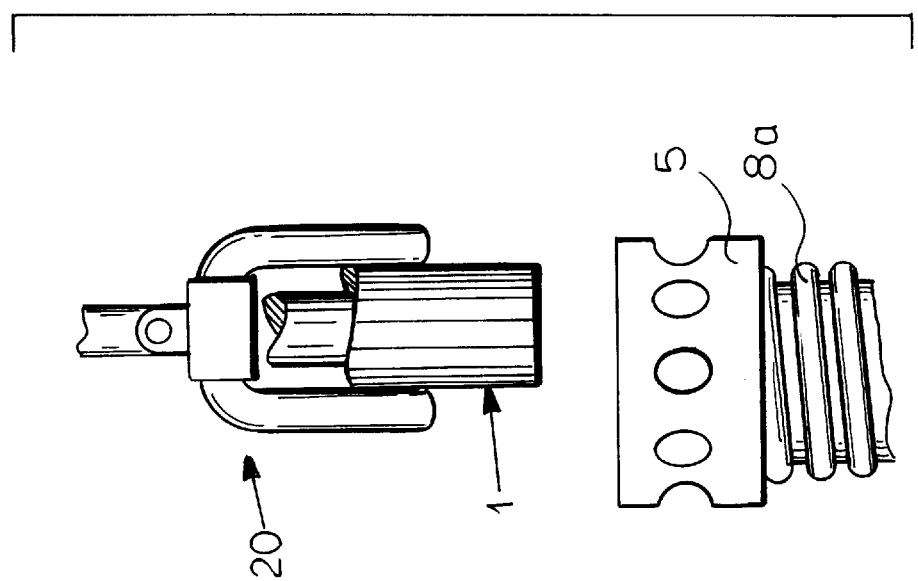
FIG. 5 is a fragmentary elevational view showing the loading of a mixing head into the rinsing flange or housing.

As can be seen from FIG. 5, the mixing head 1 can be transferred by an industrial robot 20 to the housing or flange 5 after each injection cycle. FIG. 4 shows that each of the orifices 6, of which a multiplicity can be provided, can be selectively supplied with hot water via a conduit 7a and a valve 7a', with steam via a conduit 7b and a valve 7b', or with compressed air or other drying gas via a conduit 7c and a valve 7c' or can be subjected to suction via a conduit 7d and a valve 7d'.

In operation, the mixing head after filling of the mold or after each injection cycle is transferred by the industrial robot or by hand so that its end is positioned in the rinsing flange or housing 5. In this operating phase, the cleaning plunger 2 is in its most advanced position in which the mixture has been fully discharged from the head and only residues remain at the end of the region of the opening 3 and the surrounding circular end phase of the head. These droplets are fully removed by the jets of hot water from the orifices 6 and the residue is collected in the filter bag 9 where the rinsing water which passes through the filter collecting in the vessel 10. From there the rinsing medium is recirculated to the housing or flange 5. After complete rinsing, the end of the mixing head can be treated with dry gas under pressure, the compressed air, which removes the traces of rinsing liquid. The gas can be admitted through the same orifices 6 as were used for the rinsing liquid or through separate orifices 6a alternating with the orifices 6. In addition or alternatively, the mixing head can be subjected to suction to remove the rinsing liquid. The mixing head can then be returned to mold for the next injection operation.

We claim:

1. A device for removing droplet residues of a plastic composition formed from two chemically reactive components of a synthetic resin on a mouth of a discharge chamber of a mixing head in which a cleaning plunger is reversibly movable, said device comprising:

- a housing formed with an annular opening receiving said mouth of said head;
- at least one inwardly directed generally radial spray nozzle formed in said housing, trained upon said mouth of said head, and lying in a plane of said mouth;
- at least one conduit connected to each said spray nozzle for supplying a rinsing means for removing said residue from said head under pressure to said spray nozzle; and
- a drive connected with said housing for rotating same relative to said head.

2. The device defined in claim 1, further comprising an outlet tube formed in said housing and communicating with said annular opening for conducting said rinsing medium and removed residues away from said head.

3. The device defined in claim 2, further comprising a filter positioned to receive said rinsing medium and residues and separating said residues from said rinsing medium.

4. The device defined in claim 3, further comprising a collecting vessel downstream of said filter for collecting the rinsing medium from which said residues have been separated.

5. The device defined in claim 4 wherein said collecting vessel is formed with a settling chamber and with a pumping chamber separated from said settling chamber by an overflow weir.

6. The device defined in claim 5, further comprising a pump for recirculating said rinsing medium from said pumping chamber to said conduit.

7. The device defined in claim 5 wherein said filter is a bag filter having an open side, said tube having an annular collar forming a closure for said side and resiliently supported on said tube for closing said side when said collar is pressed thereagainst.

8. The device defined in claim 1 wherein said rinsing means is water.

9. The device defined in claim 8 wherein said rinsing means is hot water.

10. The device defined in claim 1 wherein said rinsing means is steam.

11. The device defined in claim 1 the rinsing means includes means for delivering compressed air toward said mouth of said head in said opening.

12. The device defined in claim 1 further comprising means for generating a negative pressure in said opening, so that said mouth of said head is subjected to suction in said opening.

13. The device defined in claim 1, further comprising an industrial robot engageable with said head for positioning said head in said opening.

14. The device defined in claim 1 wherein said housing has at least one orifice in said plane trained on said mouth of said head and provided with at least one conduit for supplying a pressurized drying gas thereto.

15. The device defined in claim 1, further comprising means for supplying a drying gas to said nozzle.

16. The device defined in claim 1, further comprising a collecting vessel downstream of said filter for collecting the rinsing medium from which said residues have been separated, said vessel being formed with a settling chamber and with a pumping chamber separated from said settling chamber by an overflow weir, and a pump for recirculating said rinsing medium from said pumping chamber to said conduit.

17. A method of removing droplet residues of a plastic composition formed from two chemically reactive components of a synthetic resin on a mouth of a discharge chamber of a mixing head in which a cleaning plunger is reversibly movable, said method comprising the steps of:

(a) introducing said head into an annular opening formed in a housing;

(b) directing against said mouth of said head in said opening a rinsing jet of a rinsing medium from a plurality of inwardly directed generally radial spray nozzles formed in said housing and lying in a plane of said mouth;

(c) collecting rinsing medium and removed residues in a settling chamber, said rinsing medium passing over an overflow weir into a pumping chamber;

(d) recirculating said rinsing medium to said nozzles from said pumping chamber; and (e) drying said mouth of said head by directing pressurized drying gas through at least some of said nozzles at said mouth.

18. The method defined in claim 17, further comprising the step of filtering the rinsing medium and said residues before said rinsing medium enters said settling chamber.

19. The method defined in claim 18, further comprising the step of subjecting said mouth to suction in said opening.

20. A device for removing droplet residues of a plastic composition formed from two chemically reactive components of a synthetic resin on a mouth of a discharge chamber of a mixing head in which a cleaning plunger is reversibly movable, said device comprising:

- a housing formed with an annular opening receiving said mouth of said head;
- at least one inwardly directed generally radial spray nozzle formed in said housing, trained upon said mouth of said head, and lying in a plane of said mouth;
- at least one conduit connected to each said spray nozzle for supplying water for removing said residue from said head under pressure to said spray nozzle;
- an outlet tube formed in said housing and communicating with said annular opening for conducting said water and removed residues away from said head;
- a filter operatively connected with said tube and receiving and separating said residues from said water;
- a collecting vessel downstream of said filter for collecting the water from which said residues have been separated;
- a pump for recirculating said water from said filter to said conduit; and
- a drive connected with said housing for rotating same relative to said head.

\* \* \* \* \*